United States Patent [19]

Moriya et al.

[11] Patent Number: 6,108,790
[45] Date of Patent: Aug. 22, 2000

[54] AUTHENTICATION SYSTEM USING NETWORK

[75] Inventors: Koji Moriya, Higashiyamato; Shigenori Morikawa, Kokubunji, both of Japan

[73] Assignee: Casio Computer Co., Ltd., Tokyo, Japan

[21] Appl. No.: 09/027,124

[22] Filed: Feb. 20, 1998

[30] Foreign Application Priority Data

Feb. 28, 1997 [JP] Japan ................................. 9-046038
Dec. 16, 1997 [JP] Japan ................................. 9-363335

[51] Int. Cl.⁷ .................................................. G06F 15/16
[52] U.S. Cl. ........................ 713/202; 713/168; 713/184; 713/201; 709/217
[58] Field of Search ........................... 713/200, 201, 713/202, 155.61, 164, 165, 166, 167, 168, 169, 170, 176, 183, 184; 709/200, 201, 202, 203, 227, 208, 216, 217, 210, 219, 224; 380/3, 4, 5, 21, 25; 379/59; 345/327

[56] References Cited

U.S. PATENT DOCUMENTS

| | | | |
|---|---|---|---|
| 4,707,852 | 11/1987 | Jahr et al. | 379/107 |
| 4,829,561 | 5/1989 | Matheny | 379/144 |
| 5,550,896 | 8/1996 | Chavez, Jr. | 379/59 |
| 5,559,888 | 9/1996 | Jain et al. | 380/25 |
| 5,781,863 | 7/1998 | Bales et al. | 455/456 |
| 5,832,383 | 11/1998 | Yahagi | 455/445 |
| 5,862,220 | 1/1999 | Perlman | 380/21 |
| 5,862,339 | 1/1999 | Bonnaure et al. | 709/227 |
| 5,880,720 | 3/1999 | Iwafune et al. | 345/327 |
| 5,999,622 | 12/1999 | Yasukawa et al. | 380/4 |

Primary Examiner—Joseph E. Palys
Assistant Examiner—Rijue Mai
Attorney, Agent, or Firm—Frishauf, Holtz, Goodman, Langer & Chick, P.C.

[57] ABSTRACT

A communication terminal stores an assigned telephone number and a number unique to the terminal. When on-line registration is to be conducted with respect to a server, a registration screen is automatically created. On the registration screen, predetermined information is already described as entry matters required for registration by using the above described numbers. By inputting a password to this screen, the user can complete on-line registration simply. When the server provides service, the server requests the user to input the user name and the password. As for the communication terminal, the server has beforehand the telephone number, information unique to the terminal, and the like in the database. In response to a communication request from the communication terminal, the server conducts authentication by using the telephone number as the user name and the terminal number as the password.

13 Claims, 13 Drawing Sheets

TERMINAL DEVICE 1

FIG.3

| TELEPHONE NUMBER | 01-2345-6789 |
|---|---|
| DEVICE KIND CODE | CX001 |
| TERMINAL NUMBER (ID) | XX-00-X-000 |
| PROVIDER TELEPHONE NUMBER | 03-9876-5432 |
| REGISTRATION COMPLETION FLAG | |
| (PASSWORD) | |

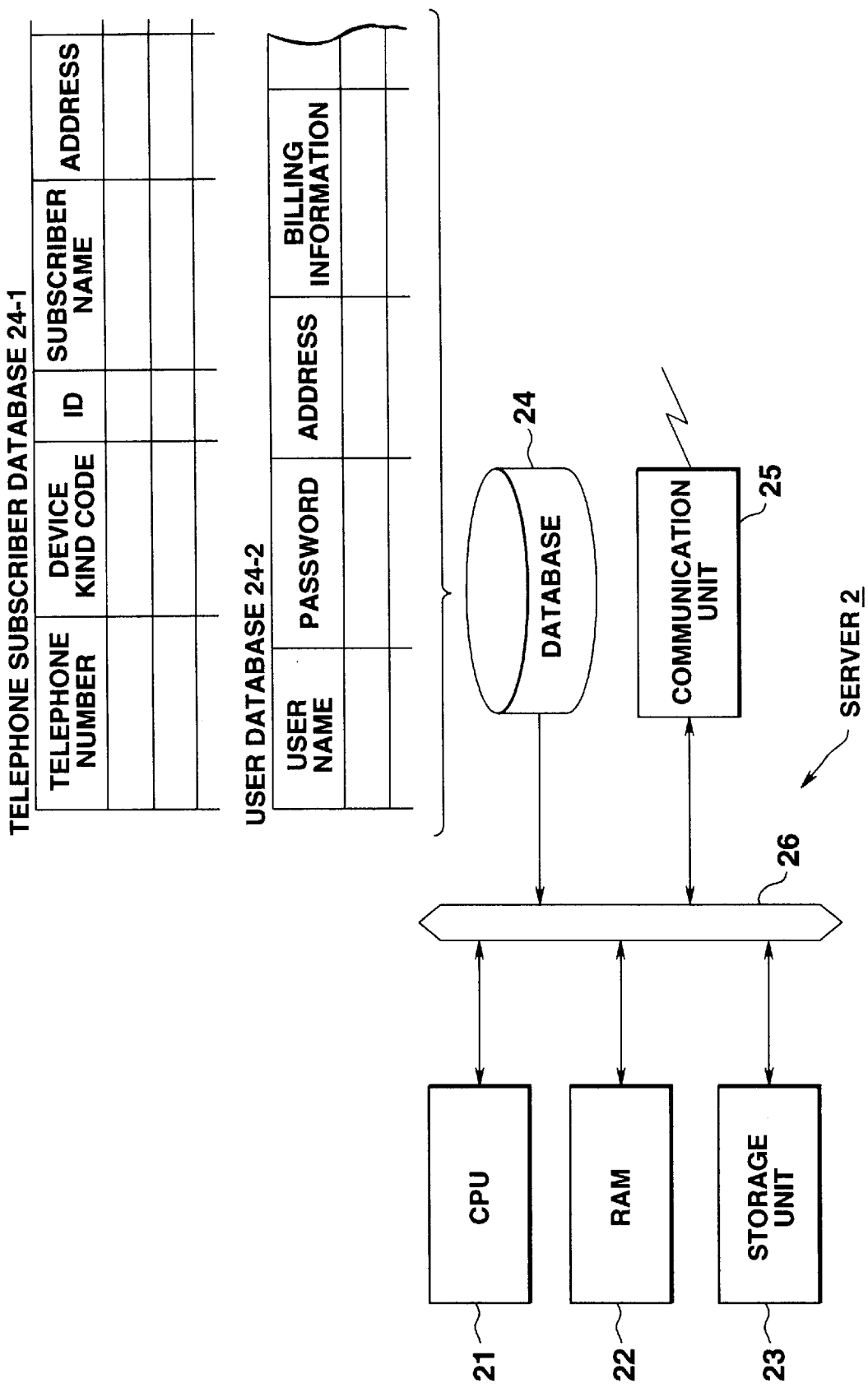

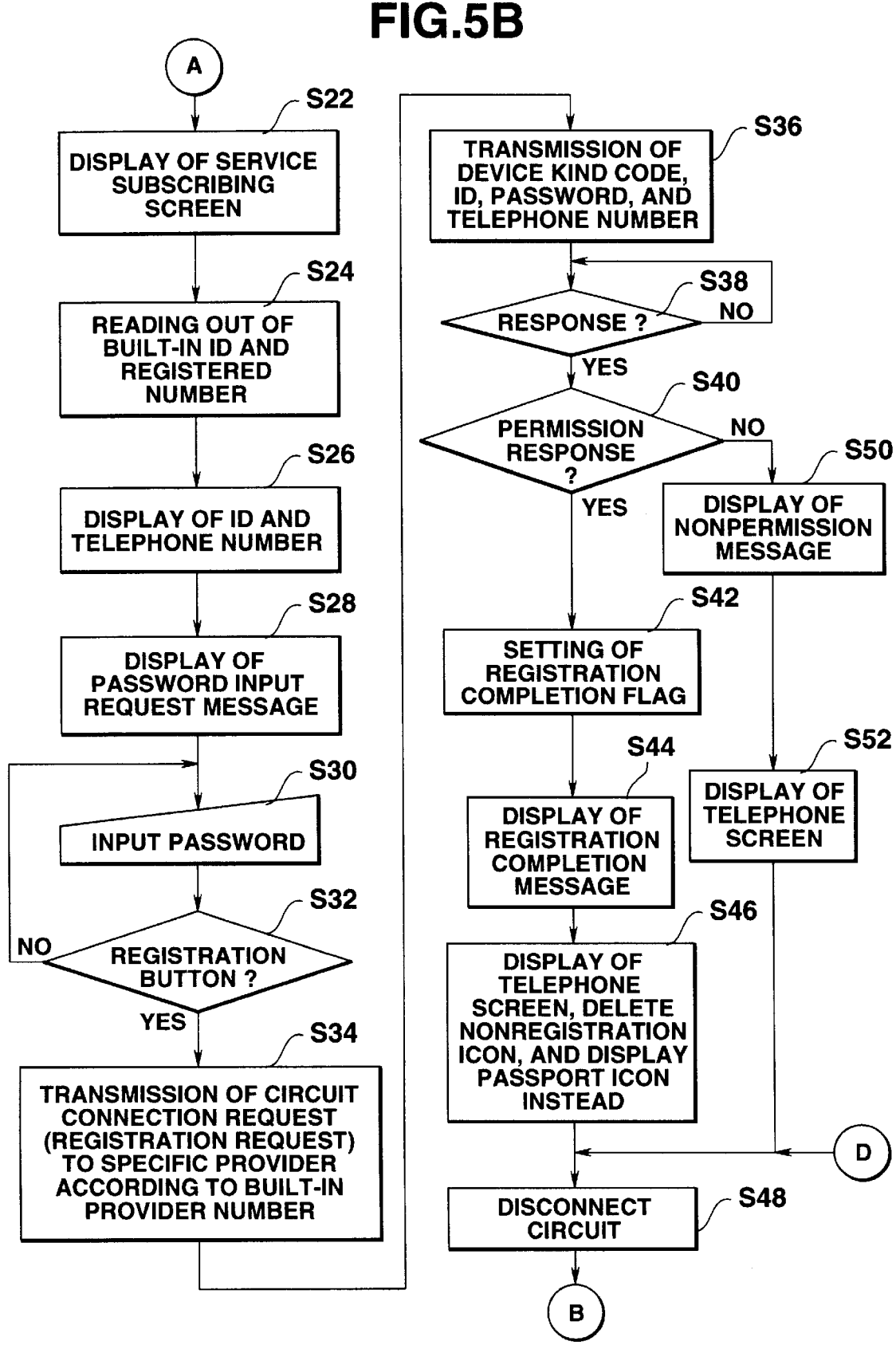

TELEPHONE SCREEN (WHEN NOT YET REGISTERED)

- 36A NUMBER BUTTON
- 36B TELEPHONE ICON
- 36C ELECTRONIC MAIL ICON
- PROVIDER ICON (NONREGISTRATION ICON 36D)

SERVICE SUBSCRIBING SCREEN

TELEPHONE SCREEN (AFTER REGISTRATION)

PROVIDER ICON (PASSPORT ICON 36F)

SERVICE MENU SCREEN

FIG.8

| USER NAME | PASSWORD | USER INFORMATION |
|---|---|---|
| 01-2345-6789 | ○○-○○-○-○○○ | ○○××  |
| 01-9999-8888 | ○○-××-○-××× | △△□□ |
| ⋮ | ⋮ | ⋮ |

FIG.10

| TELEPHONE NUMBER | FLAG | DEVICE KIND | USER NAME | PASSWORD | USER INFORMATION |
|---|---|---|---|---|---|
| 030-1234-5678 | 1 | DATA PHS | 030-1234-5678 | 01223456 | CHIYODA-KU... |
| 03-4567-8910 | 0 | PDA | ×××× | 1334567 | SUGINAMI-KU... |
| 060-8910-1112 | 1 | PDA WITH TELEPHONE FUNCTION | 044-8910-1112 | 3333333 | KAWASAKI CITY... |
| ------ | ------ | ------ | ------ | ------ | ------ |

FIG.11

| TELEPHONE NUMBER | PASSWORD | USER NAME | PASSWORD |
|---|---|---|---|
| 030-1234-4567 | 12345678 | PAD1212 | jxbu333 |
| 06-1111-2222 | 44466677 | AXZ3434 | uuuki572 |
| ------- | ------- | ------- | ------- |

AUTHENTICATION SYSTEM USING NETWORK

BACKGROUND OF THE INVENTION

The present invention relates to a system for registering a terminal device into a server on a network and authenticating a terminal device. In particular, the present invention relates to a system for simply conducting registration and authentication of a terminal device having a telephone function.

In recent years, it has become possible to connect an information processing terminal such as a personal computer or a portable terminal to a communication network such as a commercial network or the Internet so as to make various kinds of service such as electronic mail transmission and reception easily usable. Furthermore, in recent years, portable information processing terminals incorporating a telephone function have also been sold. As a result, persons who are not familiar with personal computers have increased opportunities to use networks.

In order to connect an information processing terminal to a communication network, it is necessary to conduct a registration (or subscribing) procedure for a commercial network company in the case of a commercial network, and for an Internet connection company called a provider in the case of the Internet.

In order to register a provider, a procedure of filling in a registration blank followed by mailing it, or of inputting necessary matters by means of on-line sign up is required. This procedure is a very troublesome work for a person who is not familiar with personal computers. Even after subscribing, it is necessary to connect to the network to conduct an authentication check between a terminal (or an individual and a server providing service on the network. Each time a connection is made to the network, the user needs to accurately input the user's name (or ID) and a password. In many cases, the user ID and password are meaningless character strings. Therefore, there is also inconvenience caused when the user has forgotten the user ID and password.

BRIEF SUMMARY OF THE INVENTION

An object of the present invention is to make it possible to reduce the required entry matters in the on-line registration.

Another object of the present invention is to facilitate the authentication conducted when connecting a terminal device to a server.

For achieving these objects, according to a first aspect of the present invention, there is provided a communication processing device conducting data communication with a communication service providing device connected via a communication circuit, the communication processing device comprising:

a first memory for storing a unique information assigned beforehand;

input guide means for causing a user to input a password for registering in the communication service providing device in response to specification of registration processing execution of its own communication processing device with respect to the communication service providing device; and transmission means for transmitting the password inputted by the user according to the input guide means and the unique information stored in the first memory to the communication providing device, wherein registration of its own communication processing device with respect to the communication service providing device is conducted by using the unique information and password.

According to a second aspect of the present invention, there is provided an authentication system in a network system including a server and terminal devices, the server authenticating a terminal device based on data transmitted by the terminal device, the server providing an authenticated terminal device with service, the server comprising:

terminal information storing means for storing terminal information including a terminal code and a telephone number belonging to each of the terminal devices;

receiving means for receiving a connection request and terminal information of a terminal device transmitted from the terminal devices; and authentication means for collating the terminal information transmitted from the terminal device with the terminal information stored in the terminal information storing means, and for authenticating the terminal device and permitting the connection when substantial coincidence is found, and each of the terminal devices comprising:

storing means for storing a terminal code of the terminal device and a telephone number assigned to the terminal device as terminal information; and transmitting means for transmitting a connection request and the terminal information stored in the storing means to the server.

According to a third aspect of the present invention, there is provided a terminal device having a telephone function, the terminal device being connected to a server via a network in order to be given information providing service, the terminal device comprising:

storing means for storing information unique to the terminal device and a telephone number assigned to the terminal device; and transmission means for transmitting the information unique to the terminal device and the telephone number stored in the storing means to the server as authentication data when the terminal device is connected to the server.

According to a fourth aspect of the present invention, there is provided a server for providing terminal devices having a telephone function connected to the server via a public telephone circuit with communication service, the server comprising:

terminal information storing means for storing terminal information including at least one of information unique to a terminal and a telephone number of each of the terminal devices;

receiving means for receiving the information unique to a terminal and/or the telephone number of the terminal device when the terminal device has requested connection; and authentication means for collating the information unique to the terminal and/or the telephone number received by the receiving means with the terminal information stored in the terminal information storing means, and for determining whether the terminal device should be connected to the server.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments give below, serve to explain the principles of the invention.

FIG. 3 is a diagram showing an example of terminal information stored in a memory of a communication terminal;

FIG. 4 is a configuration diagram of a server according to the present invention;

FIGS. 5A through 5C are diagrams showing a series of operation flow charts of a terminal device to which a communication processor of a first embodiment according to the present invention has been applied;

FIG. 8 is a diagram showing an example of terminal information stored in a database;

FIG. 10 is a diagram showing another example of terminal information stored in the database; and FIG. 11 is a diagram showing another example of terminal information stored in the database.

DETAILED DESCRIPTION OF THE INVENTION

Figure 1:
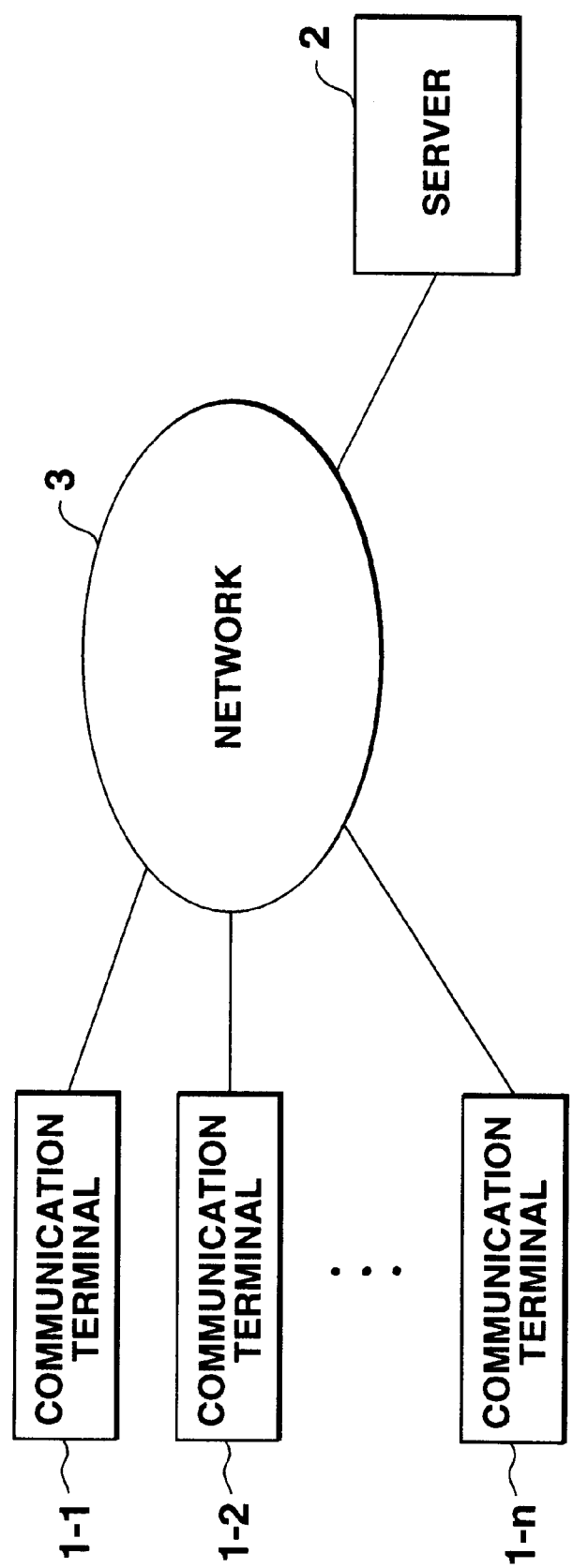
FIG. 1 is a diagram showing the configuration of a first embodiment of a network system according to the present invention.

The configuration of a network system of an embodiment according to the present invention is shown in FIG. 1.

As illustrated, this network system comprises a plurality of communication terminals 1-1 through 1-n, a server 2 provided in a service provider, and a network 3. Via the network 3, the communication terminals 1-1 through 1-n are connected to the server 2. The network 3 is public circuit such as telephone circuit.

Each of the communication terminals 1-1 through 1-n is a computer connected to a modem, a terminal adapter, or the like, or a portable electronic device such as a PDA (Personal Data Assistance).

Figure 2:
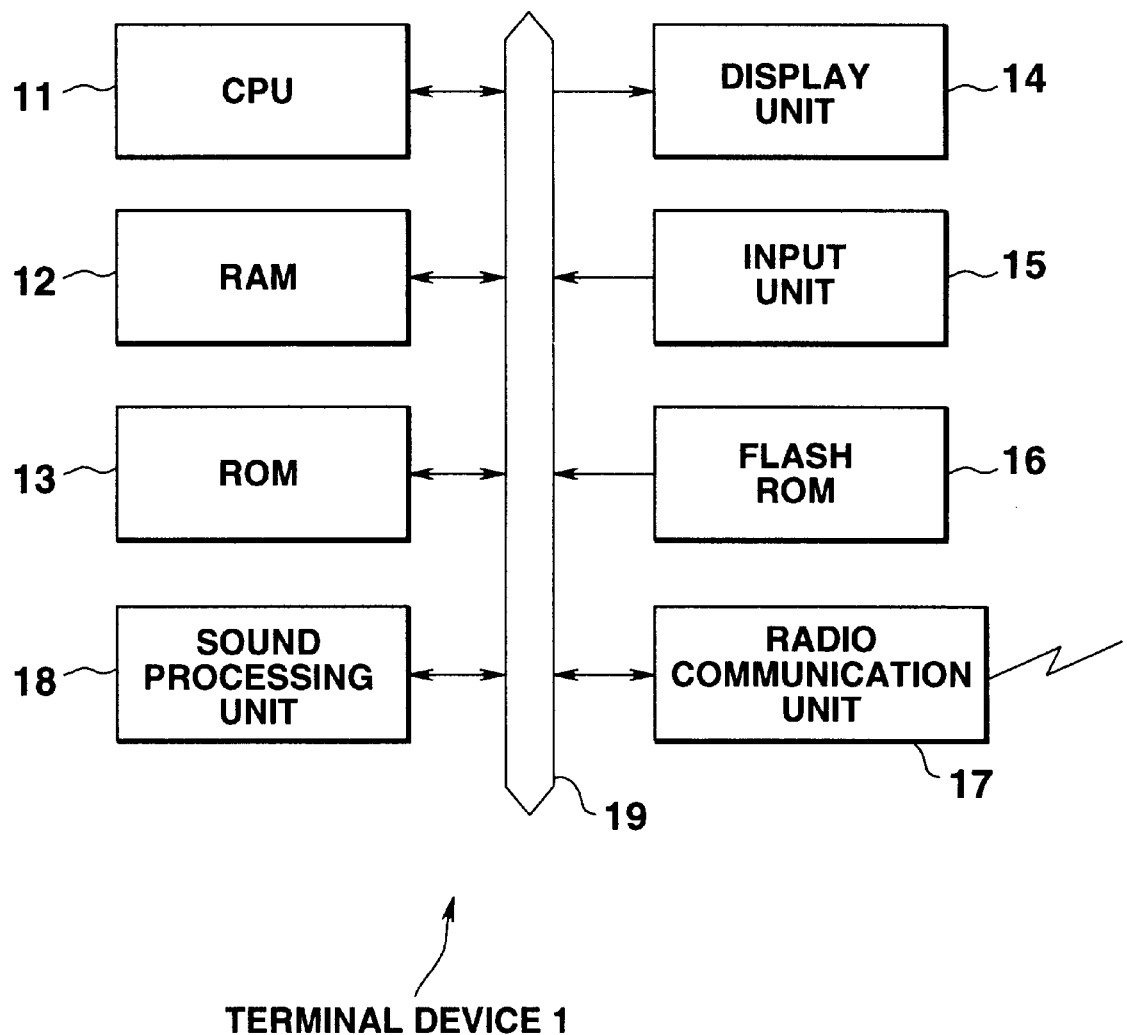
FIG. 2 is a diagram showing the configuration of a communication terminal according to the present invention.

FIG. 2 shows the configuration of a PDA having a telephone function. Hereafter, this device will be described as a terminal device 1 representing the communication terminals 1-1 through 1-n.

The terminal device 1 comprises a CPU 11, a RAM 12, a ROM 13, a display unit 14, an input unit 15, a flash ROM 16, a radio communication unit 17, and a sound processing unit 18. These components are interconnected via a bus 19.

The CPU 11 controls the components included in the terminal device 1.

The RAM 12 comprises a semiconductor memory or the like, and is used a main storage area of the CPU 11.

The ROM 13 comprises a mask ROM or the like, and stores an operation program and the like of the terminal device 1. The medium storing the operation program of the terminal device 1 may be a magnetic or optical storage medium. The storage medium is installed fixedly, or mounted so as to be freely attachable and detachable.

The display unit 14 comprises liquid crystal display elements or the like, and displays a result of processing conducted by the CPU 11 and data transmitted from the server 2.

The input unit 15 has a keyboard, various buttons, and the like for inputting a command, an electronic mail, or the like to be transmitted to the server 2.

The flash ROM 16 is an electrically rewritable nonvolatile memory. In this flash ROM 16, a telephone number of the terminal device 1 fixed when the terminal device 1 is sold (or when a contract is made), a terminal number (terminal ID) fixed at the time of manufacturing, and a device kind code are stored as information unique to the terminal as shown in FIG. 3. The terminal number comprises a country code, a manufacturing maker code, and a manufacturing serial number, and differs from device to device.

The terminal number and the device kind code are written into the flash ROM 16 in its manufacturing factory at the timing of shipping or the like. The telephone number is written into the flash ROM 16 in a store at the time of contract.

The flash ROM 16 is adapted to store the telephone number of the service provider and a registration completion flag in order to be given the network service. As occasion demands, a password may be stored in the flash ROM 16.

As for the flash ROM 16, its configuration is not restricted so long as it is a nonvolatile memory of such a type that a terminal number and a telephone number can be written therein at the time of shipping and selling. The flash ROM 16 may be replaced by a backed up RAM or the like.

The radio communication unit 17 is connected to a network 3 including radio public circuit, and transmits/receives data, sound and the like to/from the other party.

The sound processing unit 18 has a microphone, a speaker, or the like. The sound processing unit 18 reproduces a received sound, and emits the reproduced sound. The sound processing unit 18 also modulates a sound picked up by the microphone and transmits the modulated sound.

As shown in FIG. 4, the server 2 comprises a CPU 21, a RAM 22, a storage unit 23, a database 24, and a communication unit 25. These components are interconnected via a bus 26.

The CPU 21 controls the components of the server 2, and reads out and executes programs stored in the storage unit 23.

The RAM 22 comprises a semiconductor memory or the like, and it is used as a main storage area for the CPU 21.

The storage unit 23 comprises a magnetic disk device or the like, and it stores operation programs such as application programs and transmission/reception program.

The database 24 has a database 24-1 concerning telephone subscribers, a database 24-2 concerning users who contracted so as to be given service provided by the server 2, and various other databases required for providing service.

The telephone subscriber information includes data such as a telephone number, a device kind code, a terminal number (ID), a subscriber name, and a subscriber address. This information is obtained by the provider with the cooperation of a telephone company.

The user information is data of a user given the service by the provider, such as a user name (which is a broad concept including a user ID), password, address, and billing information.

The communication unit 25 has a circuit terminal device, such as a modem, connected to the network 3, and transmits/receives data to/from the communication terminals 1-1 through 1-n.

Operation conducted in such configuration will now be described.

Figure 5A:
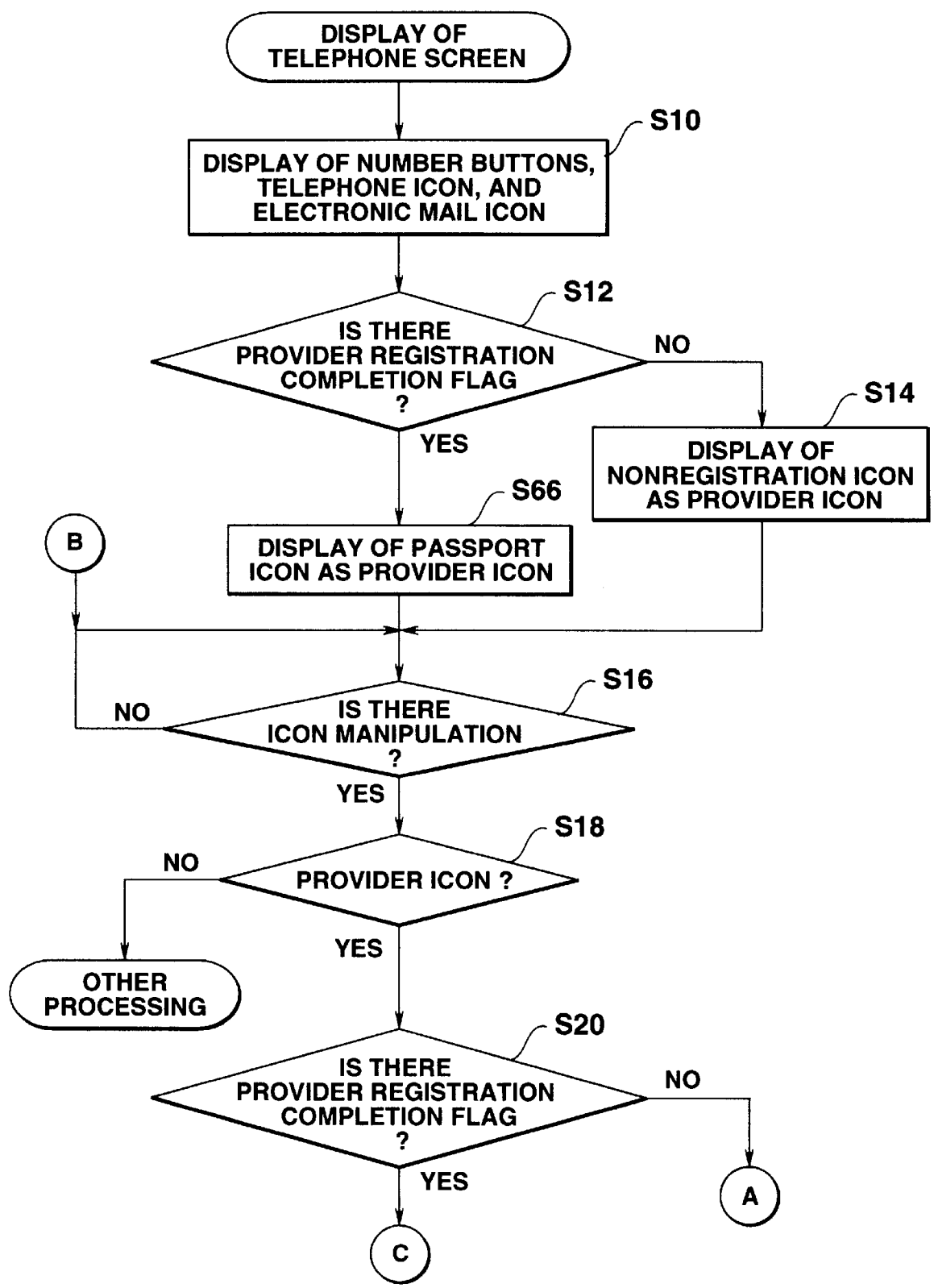
Figure 5C:
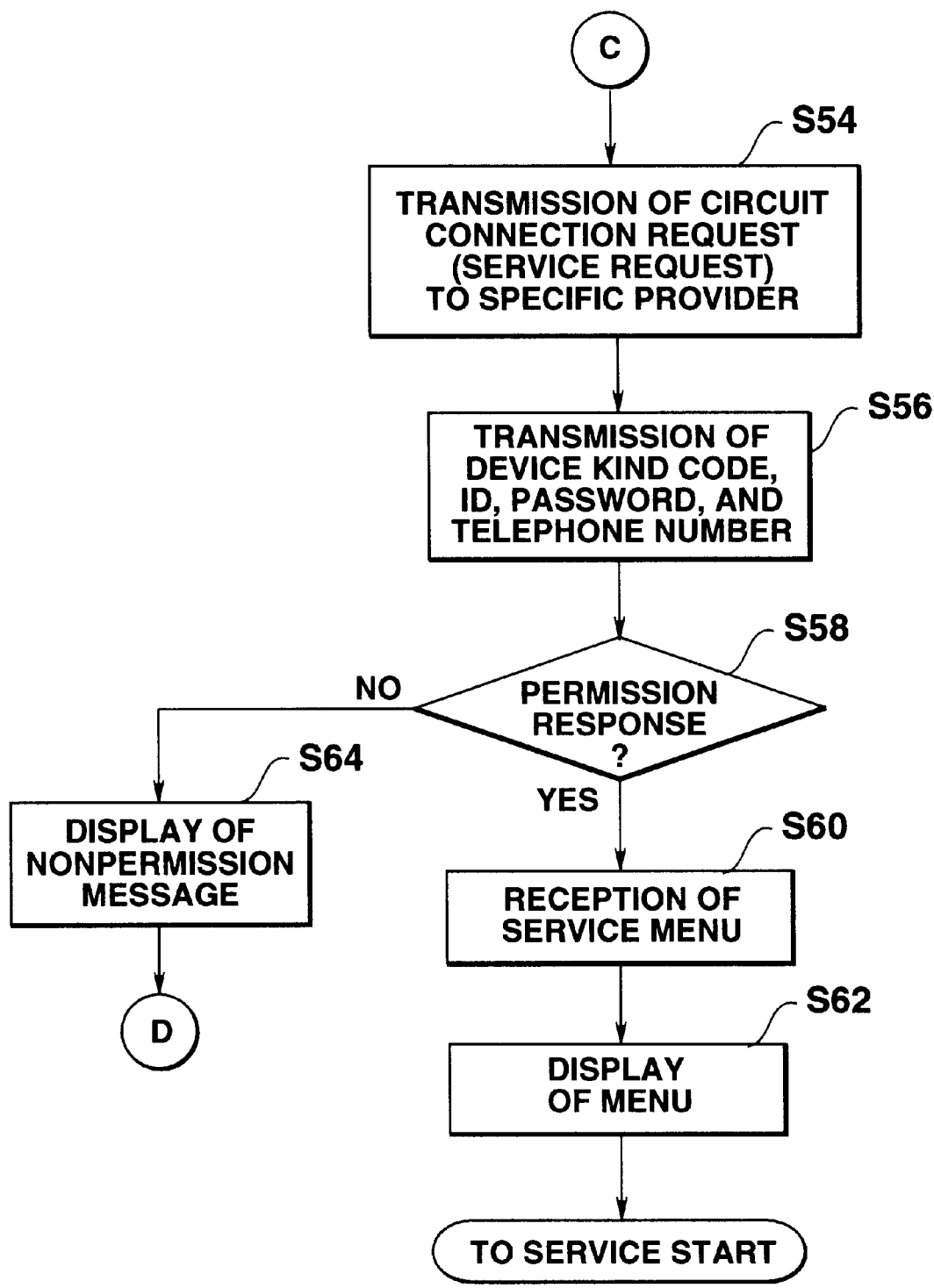

FIGS. 5A through 5C are a series of flow charts showing the operation of the terminal device 1.

Figure 7A:
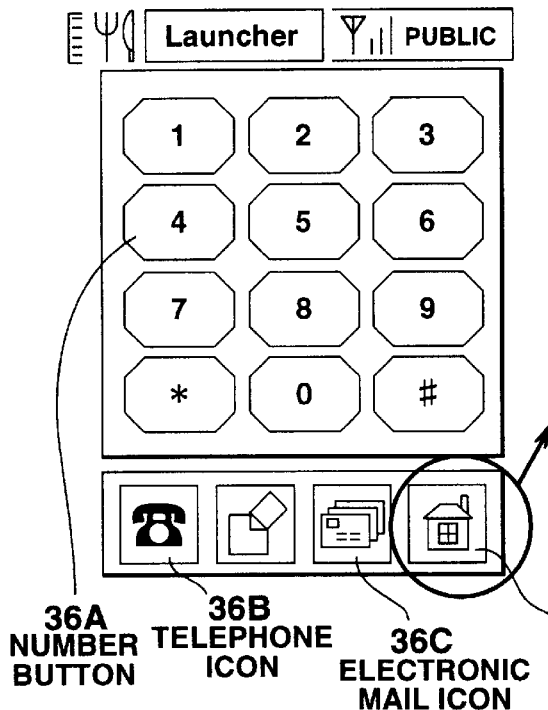
FIG. 7A is a diagram showing a telephone screen at the time when registration is not registered yet.

First of all, in the case where, for example, power is turned on and a telephone screen is displayed as an initial screen, number buttons 36A, a telephone icon 36B, an electronic mail icon 36C, and so on are displayed on the display unit 14 as shown in FIG. 7A (step S10). It is here determined whether the provider registration completion flag is stored beforehand in the flash ROM 16 (step S12). If there is no provider registration completion flag, a nonregistration icon 36D is displayed on the telephone screen as a provider icon (step S14).

Here, icon manipulation is waited (step S16). If icon manipulation using the input unit 15 is conducted, it is determined whether a provider icon (nonregistration icon 36D in this case) has been manipulated (step S18). If a different icon has been manipulated, processing corresponding to that manipulation icon is conducted. Since the processing has no relation to the principal point of the present invention, description thereof will be omitted.

Figure 7B:
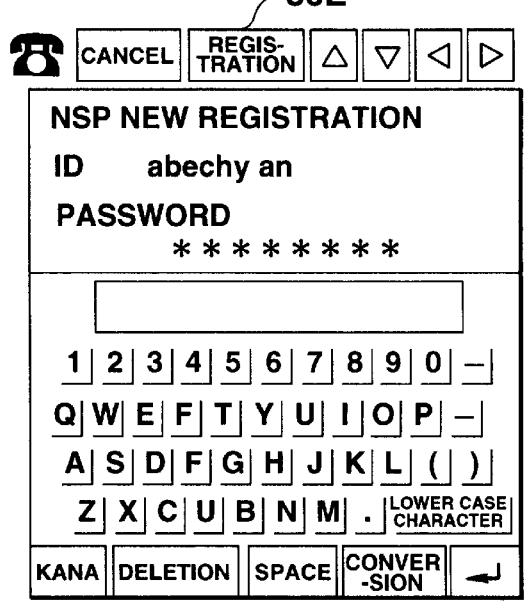
FIG. 7B is a diagram showing a service subscribing screen displayed when provider icons are manipulated on the telephone screen.

When the provider icon is judged to have been manipulated (step S18), it is determined whether the provider registration completion flag is stored beforehand in the flash ROM 16 (step S20). If there is no provider registration completion flag, then a service subscribing screen as shown in FIG. 7B is displayed on the display unit 14 (step S22), and the ID and registered telephone number are read out from the flash ROM 16 (step S24) and displayed on the service subscribing screen (step S26). A message requesting password inputting is displayed (step S28).

In response to this, the user inputs a desired password (step S30), and manipulates a registration button 36E (step S32). As a result, a specific provider is called according to the telephone number of the service provider stored in the flash ROM 16, and a circuit connection request (registration request in this case) is transmitted (step S34). The device kind code, ID, inputted password, and telephone number of the terminal device 1 are transmitted (step S36), and a response is waited (step S38). The inputted password may be written into a predetermined area of the flash ROM, and at the next time on the server access is requested, this stored password may be transmitted in order to omit the user's input manipulation.

Figure 6:
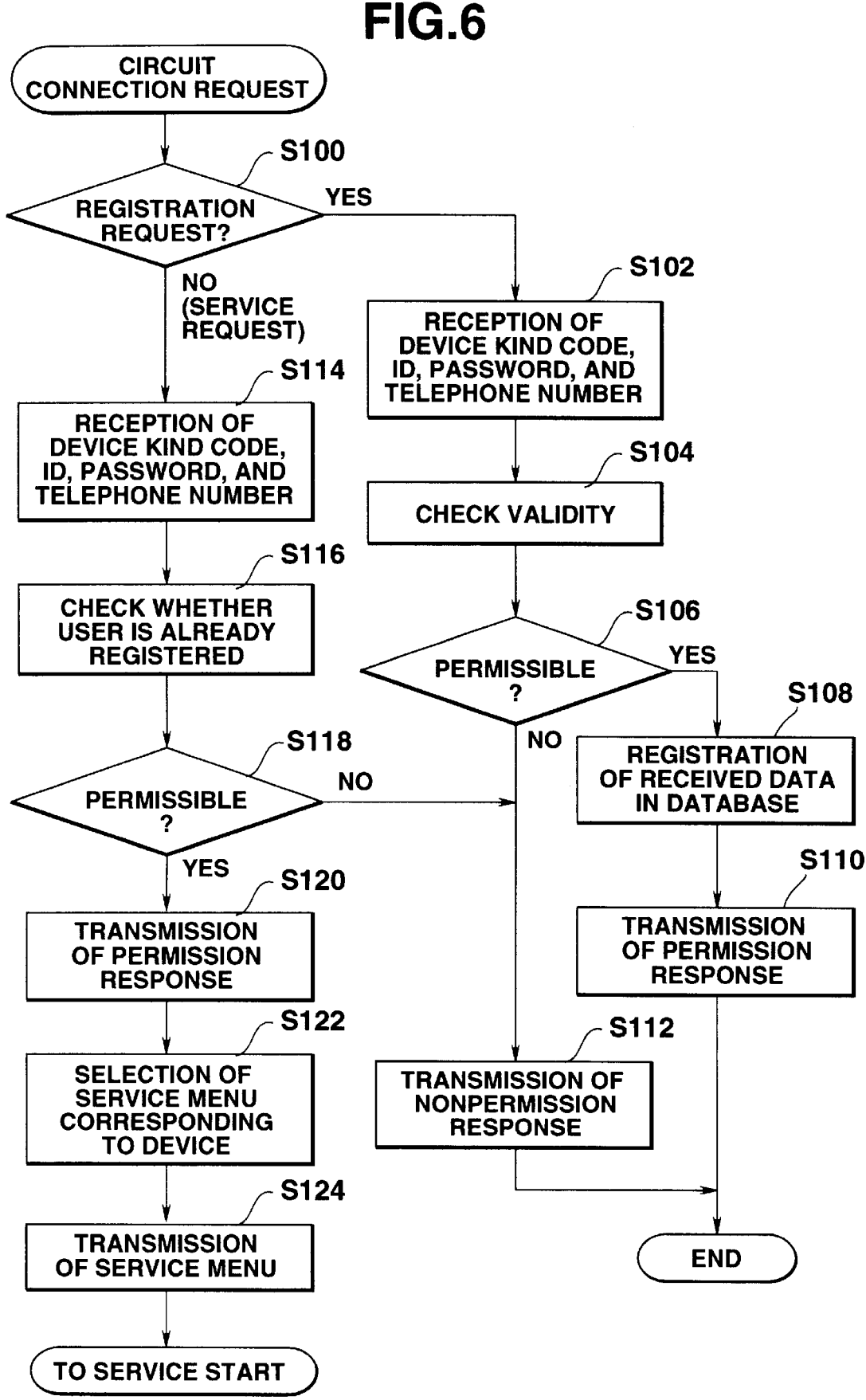
FIG. 6 is a flow chart of a service provider side.

FIG. 6 is a flow chart showing the operation of the server 2 located on the side of the service provider.

Upon receiving the circuit connection request, it is first determined whether the circuit connection request is a registration request (step S100). If the circuit connection request is a registration request, the device kind code, ID, password, and telephone number are received (step S102). And the database 24-1 of telephone subscriber information stored beforehand is referred to, and a check is executed to determine whether the validly registered telephone number and ID have been transmitted (step S104). If the result is permissible (step S106), then authentication data concerning the user which has been connected for the first time in order to conduct registration is created on the basis of the password and the like of the received data and the data of the telephone subscriber database, and registered into the user database 24-2 (step S108), and a permission response is transmitted (step S110).

On the other hand, if the result of the validity check is impermissible (step S106), then nonpermission response is transmitted (step S112).

Figure 7C:
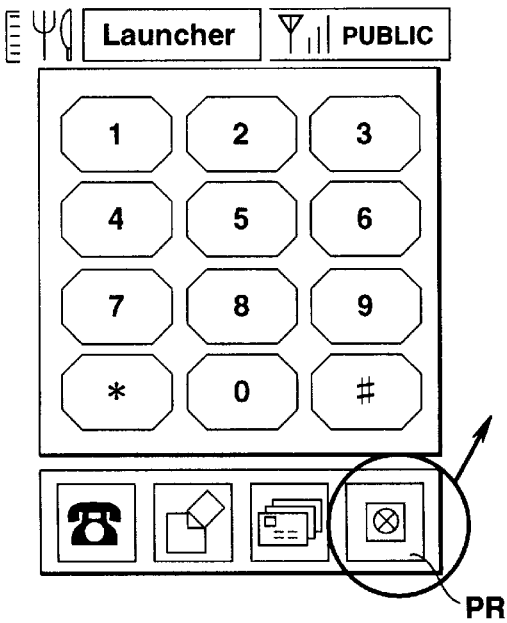
FIG. 7C is a diagram showing the telephone screen displayed after registration.

Upon receiving a response from the service provider (step S38), the terminal device 1 determines whether the response is a permission response (step S40). If the response is a permission response, then the registration completion flag is set in the flash ROM 16 (step S42), a registration completion message is displayed for a fixed time (step S44), and then a telephone screen is displayed as shown in FIG. 7C. At this time, a passport icon 36F is displayed as the provider icon instead of the nonregistration icon 36D (step S46). By the display of this passport icon 36F, the user can know that registration of the terminal device 1 was already conducted. And the circuit is disconnected (step S48), and the processing returns to the step S16, and icon manipulation is waited.

If the nonpermission response is received as the response from the service provider (step S40), then a nonpermission message is displayed (step S50), the display is then returned to the telephone screen display (step S52), the processing proceeds to the step S48, and the circuit is disconnected. In this case, therefore, the nonregistration icon 36D remains displayed as the provider icon. Thereby, the user can know that the registration is not completed.

It is now assumed that the registration was completed as described above and icon manipulation is conducted on the telephone screen. If the icon manipulation is judged to be the manipulation of the provider icon (step S18), it is determined whether the provider registration completion flag is stored beforehand in the flash ROM 16 (step S20). This time, the provider registration completion flag is judged to be present. In this case, therefore, the circuit connection request (service request in this case) is transmitted to the specific provider (step S54), and the device kind code, ID, password, and telephone number of that terminal device 1 are transmitted (step S56). The password in this case may be one inputted by the user or one stored in the flash ROM 16.

In the server 2 of the provider, if the circuit connection request is not a registration request but a service request (step S100), then the device kind code, ID, password, and telephone number are received (step S114) and it is determined whether those received data are data of already registered user by referring to the user database 24-2 (step S116). If the data is impermissible received data from an unregistered user (step S118), then the processing proceeds to the above described step S112 and a nonpermission response is transmitted. On the other hand, if the user is a permissible registered user, a permission response is transmitted (Step S120). Thereafter, a service menu corresponding to the device stored in the storage device 22 is selected (step S122), the service menu is transmitted (step S124), and the service is started.

Figure 7D:
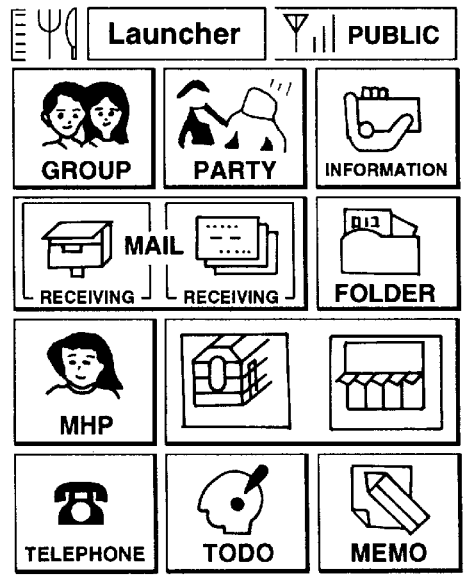
FIG. 7D is a diagram showing a service menu screen displayed when manipulating provider icons after registration.

In the side of the terminal device 1, if the response from the service provider is a permission response (step S58), then the service menu is received (step S60) and the received service menu screen is displayed as shown in FIG. 7D (step S62) in order to be able to be given various kinds of service.

If a nonpermission response is received, then a nonpermission message is displayed (step S64) and thereafter the processing is returned to the above described step S48 to disconnect the circuit.

If the provider registration completion flag is judged to be present at the step S12, then the passport icon 36F is displayed as the provider icon (step S66) and icon manipulation is waited (step S16).

In the portable terminal device 1 incorporating the telephone function according to the present first embodiment, the user thus needs only to input a desired password at the time on-line registration. The data required for the registration, such as the ID and the telephone number, are automatically added to the password by the terminal device 1 itself, and resultant data are transmitted to the service provider 2. As a result, the labor of the user registration procedure can be lightened.

A second embodiment will now be described.

The second embodiment is a system further simplifying the authentication.

When a provider is accessed by a personal computer or the like and provides predetermined service, the provider in general requests the user to input the user ID and the password in order to authenticate the user as a normal user. The server 2 installed in the provider of this system has a user database 24-2'. As for the terminal device 1, the user database 24-2' stores the telephone number of the terminal device 1 as the user name and the terminal number as the password as shown in FIG. 8.

The database is created by using data provided by a telephone company or the like.

Figure 9:
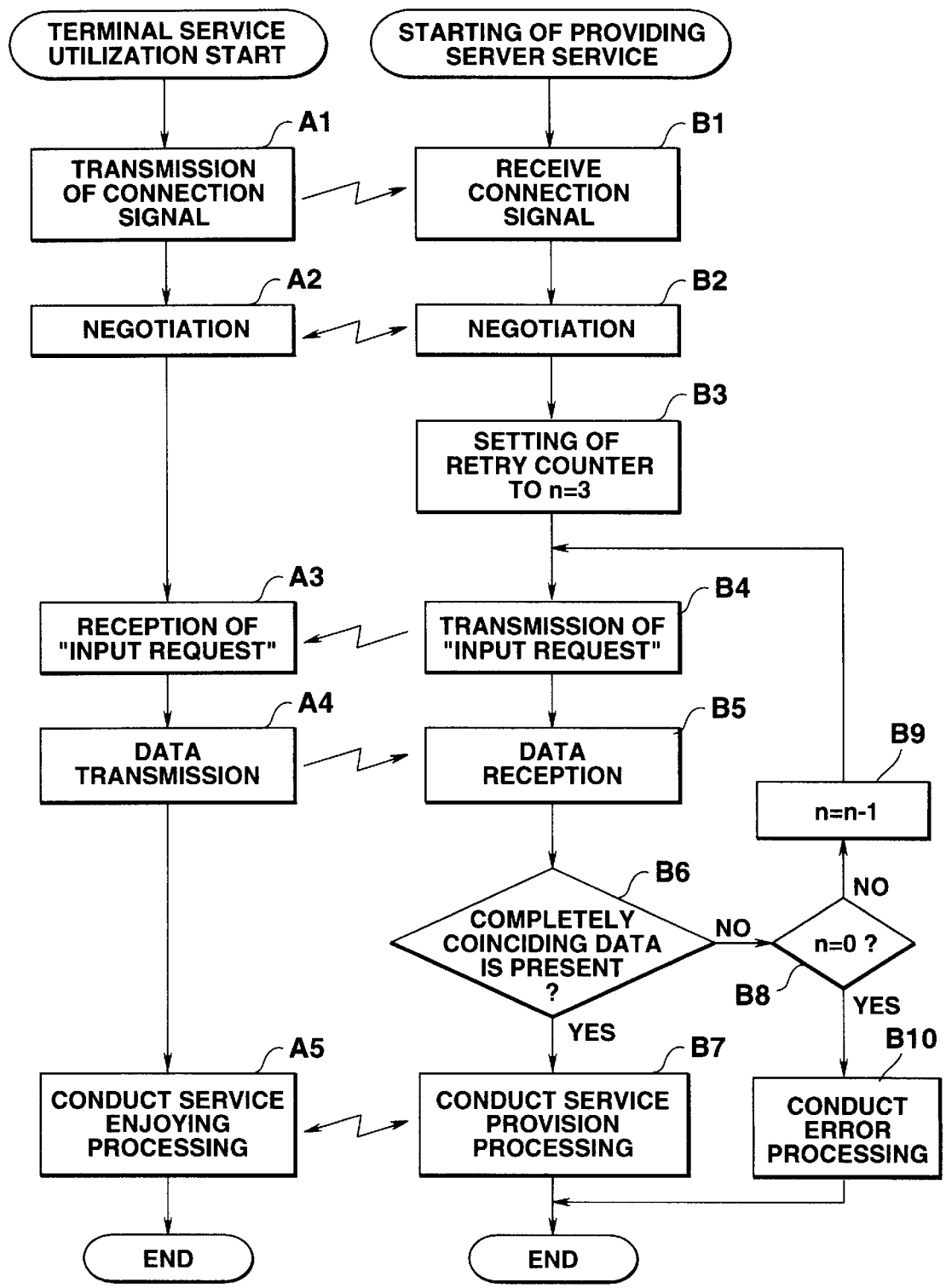
FIG. 9 is a flow chart illustrating the operation of an authentication method concerning a second embodiment according to the present invention.

An authentication method of the network system of this embodiment will be described by referring to FIG. 9.

Here, the authentication method will be described by taking the case where a user A is connected to the server 2 by using the terminal device 1 having the configuration of FIG. 2 and given data providing service of stock information or the like, as an example.

In order to connect to the server 2, the user A manipulates the input unit 15 and inputs the telephone number of the server 2. As this telephone number, the telephone number stored in the flash ROM 16 shown in the first embodiment may be used. In response to this manipulation, the CPU 11 calls the server 2 on the phone (i.e., transmits a connection signal to the server 2) via the radio communication unit 17 (step A1).

The communication unit 25 of the server 2 receives the connection signal (i.e., connection request) transmitted from the terminal device 1 (step B1).

According to the connection signal supplied from the terminal device 1, the communication unit 25 conducts off-hook control, dial up control of the connection destination, and modem negotiation control between the terminal device 1 and the server 2 (step A2, step B2).

After the negotiation control has been finished, the CPU 21 sets a retry counter n taking the communication error into consideration to, for example, 3(n=3)(step B3). After setting the retry counter n, the CPU 21 transmits an input request signal requesting the terminal device 1 to input the user name and password for authentication to the terminal device 1 via the communication unit 25 (step B4).

The CPU 11 of the terminal device 1 receives the input request signal transmitted from the server 2 via the communication unit 17 (step A3), reads out the terminal information (i.e., the telephone number and the terminal number) stored in the flash ROM 16, and transmits the telephone number and the terminal number respectively as the user name and the password to the server 2 via the communication unit 17 (step A4).

The CPU 21 of the server 2 receives the telephone number and the terminal number transmitted respectively as the user name and the password from the terminal device 1 via the communication unit 25 (step B5) and store them in the RAM 22. The CPU 21 collates the user name (telephone number) and the password (terminal number) stored in the RAM 22 with the user name and the password stored in the database 24-2', and determines whether completely coinciding user name and password are present. If coincident data is present, then the CPU 21 authenticates the terminal device as a registered user, and permits the connection or the service provision (step B6). If coincident data is not present, the CPU 21 does not authenticate the other party of the connection and refuses the connection or the service provision (step B6).

If the terminal device 1 is authenticated at the step B6, the CPU 21 conducts processing for the connection and service provision, such as transmission of the selection menu of service stored in the storage unit 23 and capable of being provided by the server 2 to the terminal device 1 (step B7).

The CPU 11 of the terminal device 1 receives the selection menu transmitted from the server 2 via the communication unit 17, and displays the selection menu on the display unit 14. In addition, the CPU 11 accesses the server 2 according to the received selection menu, and enjoys the subsequent service (step A5). The server 2 provides service according to the request of the terminal device 1.

If it is determined at the step B6 that the terminal of the other party (terminal device 1) is not authenticated, the CPU 21 determines whether the retry counter n stored in the RAM 22 is 0(n=0) (step B8). If n is judged at the step B8 to be not equal to 0, then the retry counter n is decreased by one as represented by (n−1) (step B9), the flow returns to the step B4 of the transmission of the input request signal, and the above described operation is conducted again.

If n is judged at the step B8 to be equal to 0, then the CPU 21 judges the received user name and password to be noncoincident with the terminal information of the database 24 of the server 2, i.e., judges the received user name and password not to be stored in the database 24 of the server 2, and conducts error processing, such as disconnection of the connected circuit (step A20).

In the case where one of the communication terminals 1-1 through 1-n, such as ordinary personal computers, request the server 2 to conduct connection, the communication terminal transmits the ordinary user name and password to the server 2. On the basis of this, the authentication processing of the step B6 is conducted.

In the above described embodiment, the telephone number and the terminal number are transmitted at the step A3 respectively as the user name and the password for authentication. Alternatively, the terminal number and the telephone number may be transmitted respectively as the user name and the password. In this case, the database 24 of the server 2 stores the terminal number as the user name and stores the telephone number as the password.

Furthermore, the telephone number (or the terminal number) may be transmitted as the password and the user name. In this case, the terminal information of the server 2 stores the telephone number (or the terminal number) as the user name and the password. As a result, the time required for the authentication can be shortened and the amount of transmission data can be suppressed.

In the foregoing description, the server 2 requests the terminal device to input the user name and the password at the step B4. Alternatively, the server 2 may judge the other party of communication, and request the ordinary user name and password in the case where the other party is an ordinary personal computer or the like, or request the telephone number and the terminal number in the case where the other party of communication is a PDA or the like having a unique telephone number or the like and a telephone function.

In this case, a flag besides the data of the telephone number or the like is prepared in the database 24 of the server 2 as information of a user who contracted with (registered in) the provider as shown in FIG. 10. The flag identifies whether the communication terminal 1-1 through 1-n used by the user is a device having a telephone function, such as a PDA, or a device having no unique telephone number, such as a personal computer.

Upon being informed of the telephone number of the transmission source by an exchange or the like at the time of call incoming (terminating call), the server 2 determines whether the flag is set in the informed telephone number by referring to the database 24. If the flag is set beforehand to "1", i.e., the other party of the communication is a PDA having a telephone function, then the server 2 requests the terminal to transmit the telephone number and the terminal number as the authentication information. If the flag is set beforehand to "0", i.e., the other party of the communication is an ordinary personal computer or the like, then the server 2 requests the user name (including the user ID) and the password.

By using such a configuration, authentication conformed to the property of the other party of the communication becomes possible.

In some cases, a fixed form is demanded for the user name and the password requested by the service program on the server 2, and the telephone number and the terminal number cannot be used as they are as the user name and the password. In such a case, a kind of agent program may be located on the server 2. After conducting the authentication processing by using the telephone number and the terminal number, the agent program provides the user name and the password in a predetermined form to the service program.

Processing in this case will now be described by referring to FIG. 11.

First of all, the agent program and data for authentication are set beforehand in the storage unit 23 of the server 2. The data for authentication includes the telephone number and the terminal number of a registered user, and the user name and the password set beforehand for the service program as shown in FIG. 11.

Upon being called by one of the communication terminals 1-1 through 1-n, the CPU 21 of the server 2 starts the agent program on the storage unit 23. The agent program conducts the processing of the steps B1 through B6, and conducts the authentication of the terminal of the other party. Upon completion of the authentication of the terminal of the other party, the agent program provides the service program with the user name and the password registered beforehand in association with the telephone number or the like as shown in FIG. 11.

The service program confirms that the provided user name and password are registered validly beforehand and starts provision of the service to the terminal device being connected.

Alternatively, the list shown in FIG. 11 may be registered beforehand in the database 24 of the server 2. In this case, the agent program is started only when the terminal of the other party is judged to be a specific device kind such as a PDA having a telephone function. Otherwise, the authentication processing shown in FIG. 9 is conducted.

In the foregoing description, the server 2 requests the terminal device to transmit the user name and the password in Step B4. However, in the case where the exchange office or the like informs of the telephone number of the other party of communication at the timing of call incoming, that telephone number may used as it is for authentication.

Additional advantages and modifications will readily occurs to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A communication processing device conducting data communication with a communication service providing device connected via a communication circuit, said communication processing device comprising:

a first memory which stores unique information assigned beforehand;

a second memory which stores information indicative of whether the communication processing device is registered in the communication service providing device;

a commander which requests connection between the communication processing device and the communication service providing device;

a controller which analyzes the second memory in response to a request from the commander to connect the communication processing device to the communication service providing device, the controller executing the connection if the communication processing device is registered, the controller enabling a registration of the communication processing device if the communication processing device is not registered;

an input guide which enables a user to input a password to register the communication processing device for connection with the communication service providing device in response to the controller enabling registration of the communication processing device with respect to said communication service providing device;

a transmitter which transmits the password and the unique information stored in said first memory to said communication providing device, wherein registration of the communication processing device with respect to said communication service providing device is conducted by using said unique information and password.

2. The communication processing device according to claim 1, wherein said commander comprises a display which displays an identifier as a menu item for connection of the communication processing device to the communication service providing device, the display displaying the identifier in a mode which differs according to the information stored in the second memory.

3. The communication processing device according to claim 2, further comprising a third memory which stores beforehand a telephone number for effecting connection to the communication service providing device.

4. An authentication system in a network system including a server and portable terminal devices having telephone functions, the server authenticating a terminal device based on data transmitted by the terminal device, the server providing an authenticated terminal device with communication service, said server comprising:

a terminal information storage device which stores terminal information including a terminal code and a telephone number belonging to each of the terminal devices to which communication service is provided;

an input requester which transmits an input request for input of a user name and a password in response to reception of a request of providing the service;

a receiver which receives a connection request and terminal information of a terminal device transmitted from said terminal devices in response to the input request; and an authentication device which collates the terminal information transmitted from said terminal device, said terminal information being stored in said terminal information storage device, the authentication device authenticating said terminal device and permitting connection when substantial coincidence is found, each of said portable terminal devices comprising:

a storage device which stores terminal information including a terminal code of said terminal device and a telephone number assigned to said terminal device; and a transmitter which transmits to the server a connection request and said terminal information stored in said storage device.

5. The authentication system according to claim 4, wherein said authentication device conducts authentication by using user identification information and a password, and said authentication device uses one of a terminal number and a telephone number received from said terminal device as the user identification information and the other as the password.

6. A portable terminal device having a telephone function, said terminal device being connected to a server via a network via a telephone line in order to be given information providing service, the server storing terminal information including information unique to said terminal device and a telephone number belonging to the terminal device, said terminal device comprising:

a storage device which stores information unique to said terminal device and a telephone number assigned to said terminal device; and a transmitter which transmits, in response to an input request for input of a user name and a password from said server, the information unique to said terminal device and the telephone number stored in said storage device to said server so that the server authenticates said terminal device by using the terminal information, the input request being made in response to reception by the server of a request of providing the service.

7. The terminal device according to claim 6, further comprising a connection telephone number storage device which stores beforehand a telephone number of a predetermined network service provider having said server.

8. The terminal device according to claim 6, wherein said transmitter transmits one of the information unique to the terminal and the telephone number stored in said storage device as user identification information and the other as the password to said server, when said server requests said terminal device to input the user identification information and the password as authentication information.

9. The terminal device according to claim 6, wherein said transmitter transmits one of the information unique to the terminal and the telephone number stored in said storage device as user identification information and information inputted by a user as the password to said server, when said server requests said terminal device to input the user identification information and the password as authentication information.

10. A server for providing portable terminal devices having a telephone function connected to said server via a public telephone circuit with a communication service, said server having a memory for storing information unique to said terminal devices and telephone numbers assigned to the terminal devices, said server comprising;

a terminal information storage device which stores terminal information including at least one of information unique to a terminal and a telephone number of each of said terminal devices to which communication service is provided;

an input requester which transmits an input request of a user name and a password in response to reception of a request for providing the service;

a receiver which receives the information unique to a is terminal and/or the telephone number of the terminal device in response to the input request; and an authentication device which collates the information unique to the terminal and/or the telephone number received by said receiver with said terminal information stored in said terminal information storage device, and for determining whether said terminal device should be connected to said server.

11. The server according to claim 10, wherein said authentication device conducts authentication by using user identification information and a password, and said authentication device uses one of a terminal number and a telephone number received from said terminal device as the user identification information and the other as the password.

12. A computer program stored on a computer readable medium, said program being used in a portable terminal device having a telephone function, said terminal device being connected to a server via a network and an information providing service the server storing terminal information including information unique to said terminal device and a telephone number belonging to the terminal device, comprising;

a program code for reading out information unique to said terminal device and a telephone number assigned to said terminal device from a predetermined memory; and a program code for transmitting, in response to an input request for input of a user name and a password from said server, the information unique to said terminal device and telephone number read out to said server as authentication data in response to an input request for input of a user name and a password from the server, when said terminal device is connected to said server so that the server authenticates said terminal device by using the terminal information, the input request being made in response to reception by the server of a request of providing the service.

13. A computer program stored on a computer readable medium, said program being used for registering a portable terminal having a telephone function and receiving a service by telephone line in a communication service providing device, comprising:

a program code which enables a user to connect to the communication service providing device;

a program code which determines, in response to a connection instruction to the communication service providing device, whether the portable terminal device is registered in the communication service providing device;

a program code for executing a connection to request service if it is determined that the portable terminal is registered;

a program code for causing a user to input a password to register the portable terminal in the communication service providing device if it is determined that the portable terminal is not registered in the communication service providing device; and a program code for transmitting both the password input by the user and pre-set information to the communication service providing device for registration.

* * * * *